(12) United States Patent
Ikonomov et al.

(10) Patent No.: US 10,239,272 B2
(45) Date of Patent: Mar. 26, 2019

(54) METHODS OF TIRE RETREADING WITH ABUTTING TREAD COMPONENTS

(71) Applicants: Metodi L. Ikonomov, Clermont-Ferrand (FR); E. Bruce Colby, Greenville, SC (US); Dimitri G. Tsihlas, Greer, SC (US); Michael Widmyer, Duncan, SC (US); Cesar E. Zarak, Simpsonville, SC (US)

(72) Inventors: Metodi L. Ikonomov, Clermont-Ferrand (FR); E. Bruce Colby, Greenville, SC (US); Dimitri G. Tsihlas, Greer, SC (US); Michael Widmyer, Duncan, SC (US); Cesar E. Zarak, Simpsonville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 584 days.

(21) Appl. No.: 14/781,236

(22) PCT Filed: Mar. 31, 2013

(86) PCT No.: PCT/US2013/034753
§ 371 (c)(1),
(2) Date: Sep. 29, 2015

(87) PCT Pub. No.: WO2014/163611
PCT Pub. Date: Oct. 9, 2014

(65) Prior Publication Data
US 2016/0052219 A1    Feb. 25, 2016

(51) Int. Cl.
| | | |
|---|---|---|
| *B29D 30/56* | (2006.01) | |
| *B60C 11/02* | (2006.01) | |
| *B60C 11/00* | (2006.01) | |
| *B29D 30/58* | (2006.01) | |
| *B29D 30/54* | (2006.01) | |

(52) U.S. Cl.
CPC .......... *B29D 30/56* (2013.01); *B60C 11/0041* (2013.01); *B60C 11/02* (2013.01); *B29D 2030/544* (2013.01); *B29D 2030/582* (2013.01)

(58) Field of Classification Search
CPC .............. B29D 30/56; B29D 2030/544; B29D 2030/582; B60C 11/02
See application file for complete search history.

(56) References Cited

U.S. PATENT DOCUMENTS 3,283,795 A * 11/1966 Schelkmann .......... B29D 30/52
152/187
5,275,218 A    1/1994 Nakayama et al.
(Continued)

FOREIGN PATENT DOCUMENTS

EP    841199 A2 *  5/1998
EP    2 186 655 A1   5/2010
(Continued)

OTHER PUBLICATIONS

Machine translation for WO 2009/072633 (Year: 2017).*
PCT/US2013/034753 International Search Report and Written Opinion dated Jul. 9, 2013, 9 pages.

*Primary Examiner* — Steven D Maki
(74) *Attorney, Agent, or Firm* — Hahn Loeser & Parks LLP

(57) ABSTRACT

The present invention includes methods for forming a retreaded tire, which includes the steps of providing an annular tire carcass and providing a plurality of tread components each comprising an independent structure, which are then assembled to form an assembled tire tread. The tread is subsequently bonded to the tire carcass to form a retreaded tire, the tire tread being arranged along an outer circumference of the annular tire carcass with a bonding layer between the tire tread and the tire carcass, the bonding layer comprising an uncured elastomeric material being (Continued)

cured during the step of bonding. The tire tread is assembled such that the plurality of tread components are concurrently arranged around the outer circumference of the tire carcass to form a tire tread.

21 Claims, 5 Drawing Sheets

(56) References Cited

U.S. PATENT DOCUMENTS

| | | | | |
|---|---|---|---|---|
| 6,368,439 B1* | 4/2002 | Bender | ............ | B29D 30/54 |
| | | | | 156/128.1 |
| 6,415,835 B1* | 7/2002 | Heinen | ............ | B60C 11/0309 |
| | | | | 152/209.21 |
| 2004/0256057 A1* | 12/2004 | Gridley | ............ | B29D 30/54 |
| | | | | 156/405.1 |
| 2007/0209325 A1* | 9/2007 | Lelio | ............ | B29D 30/56 |
| | | | | 53/434 |

FOREIGN PATENT DOCUMENTS

| | | | |
|---|---|---|---|
| GB | 573707 A | | 12/1945 |
| GB | 744827 A | | 2/1956 |
| GB | 746375 A | * | 3/1956 |
| GB | 869752 A | | 6/1961 |
| GB | 1577154 A | | 10/1980 |
| WO | 2009/072633 A1 | | 6/2009 |
| WO | WO-2009/072633 A1 | * | 6/2009 |
| WO | 2012/091708 A1 | | 7/2012 |

* cited by examiner

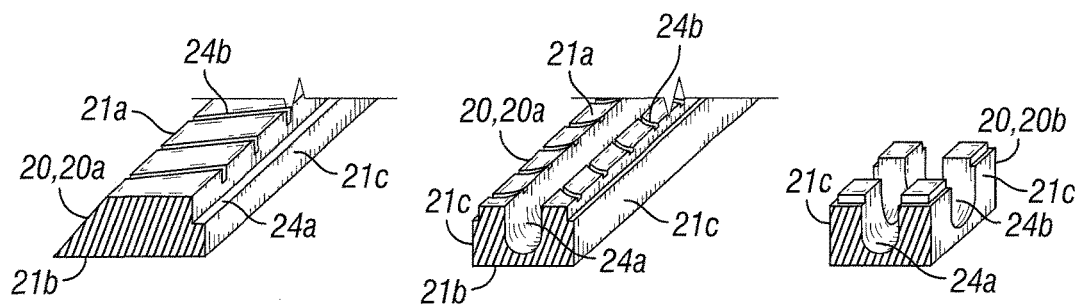
FIG. 2A  FIG. 2B  FIG. 2C
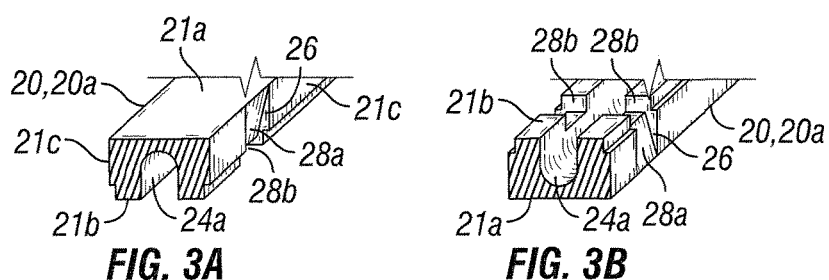
FIG. 3A  FIG. 3B
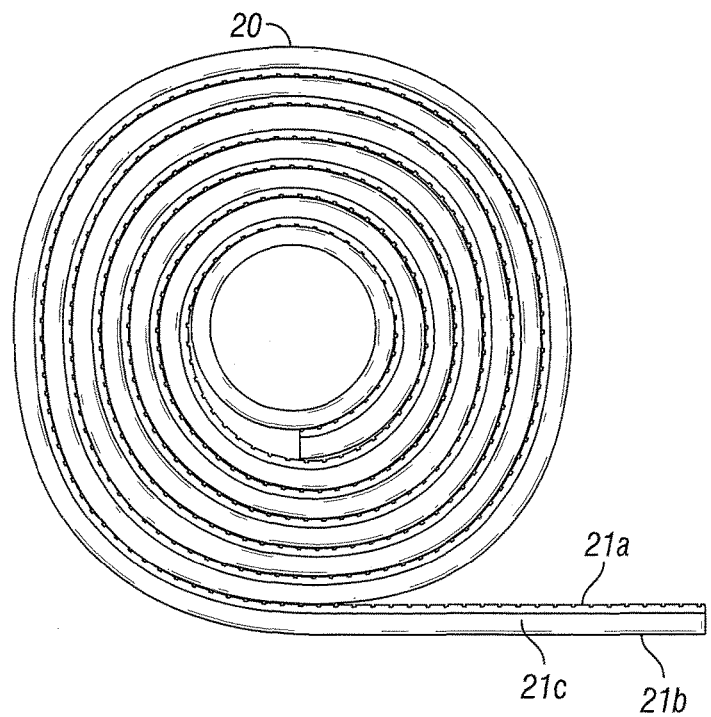
FIG. 4

METHODS OF TIRE RETREADING WITH ABUTTING TREAD COMPONENTS

This application is a National Stage application of International Application No. PCT/US2013/034753, filed Mar. 31, 2013.

BACKGROUND OF THE INVENTION

Field of the Invention

This invention relates generally to methods for retreading tires, and more particularly, to methods for forming a tire tread from a plurality of separate, independent tread components.

Description of the Related Art

When a tire becomes worn, the tire can be restored with application of a new tire tread. The tire carcass (i.e., tire casing) of large truck tires and bus tires, for example, are typically retreaded as part of a routine tire-management program. The tire carcass of these types of tires is expected to last several hundred thousand miles and be amenable to having a new tread adhered to it several times. Such tires are quite expensive and are therefore bought with the expectation that the high initial costs are offset by the long service life of the tire carcass and the low comparative cost of retreading. Indeed, the economics included in the selection and purchase of such tires often dictate that the original tires be capable of being retreaded as many as three or four times, if not more.

A variety of procedures and different types of equipment are available for use in retreading (also known as, recapping) pneumatic tires. One of the first steps in retreading a worn tire is to remove any remaining tread material from the tire carcass, for example, by a procedure known as buffing. Next a layer of green rubber (that is, uncured rubber), which is known as "cushion gum," is applied to the carcass to form a bonding layer. This layer of uncured rubber may be extruded directly onto the tire carcass or rolled onto the carcass. Finally, a tread band is applied atop the layer of cushion gum.

In the cold recapping process, the tread band is cured rubber, and has a tread pattern already impressed in its outer and/or inner surfaces. Such precured tread bands, as the term is used herein, refer to tread bands that have been cured either fully or to some lesser extent but have undergone to some extent a curing process. The assembled retreaded tire is then placed in an autoclave, and heated under pressure for an appropriate time to induce curing of the bonding layer, and therefore bonding of the tread band to the tire carcass. The term "cure" or "curing" refers to the formation of cross-links between the elastomer molecules in the rubber compound, otherwise known as vulcanization.

In the hot recapping process, the tire tread is uncured rubber and typically has no or very little tread pattern formed therein when initially placed on the tire carcass. The assembled retreaded tire, with the uncured tread, is placed in a tire mold and heated under pressure for an appropriate time to mold and cure the tire tread with a desired tread pattern, and to cure the bonding layer, which thereby bonds the tire tread to the tire carcass.

Buffing the old tread from the tire carcass in preparation of the retreading process removed rubber that is discarded as waste. Much of this waste rubber is typically replaced during the retreading process as part of the undertread portion of the tread band that is bonded to the tire carcass as a result of the retreading process. It would be advantageous if the amount of waste rubber discarded is reduced.

SUMMARY OF THE INVENTION

Particular embodiments of the present invention include tire treads, methods of forming a plurality of tread components for use in assembling a tire tread, methods for forming a tire tread from a plurality of separate, independent tread components, and methods of forming a retreaded tire.

Particular embodiments of methods for forming a retreaded tire include the steps of providing an annular tire carcass configured for receiving a tread and providing a plurality of tread components each comprising an independent structure. A further step includes assembling the plurality of tread components to form a tire tread, the tire tread having a thickness extending between a top side configured to engage a ground surface during tire operation and a bottom side configured for attachment to an annular tire carcass configured for receiving the tire tread. Yet a further step includes bonding the tread to the tire carcass to form a retreaded tire, the tire tread being arranged along an outer circumference of the annular tire carcass with a bonding layer between the tire tread and the tire carcass, where the bonding layer includes an uncured elastomeric material being cured during the step of bonding.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

FIG. 2A is a front top perspective view of a tread component comprising a shoulder component comprising a rib, in accordance with particular embodiments of the invention.

FIG. 2B is a front top perspective view of a tread component comprising a full-length central component, in accordance with particular embodiments of the invention.

FIG. 2C is a front top perspective view of a tread component comprising a partial-length central component, in accordance with particular embodiments of the invention.

FIG. 3A is a front top perspective view of a tread component shown in an upright arrangement, the tread component comprising a central component comprising a rib with a bottom side void and having venting passages, in accordance with particular embodiments of the invention.

FIG. 3B is a front bottom perspective view of the tread component of FIG. 3A, shown in an inverted arrangement to better show the vent passages arranged therein.

FIG. 4 is a tread component winding comprising a wound length of the tread component of FIG. 2B, in accordance with a particular embodiment of the invention.

Figure 6A:
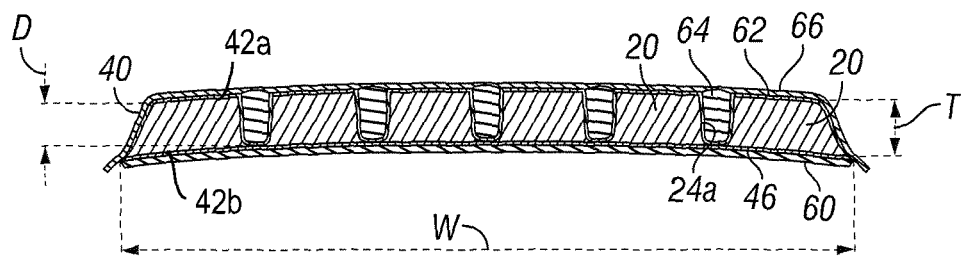

FIG. 6A is a front section view of an assembled tire tread comprising a plurality of tread components arranged in a side-by-side, spaced-apart arrangement to form top side grooves atop a base retention structure and extending the full thickness of the tire tread to form a full depth groove with a bonding layer arranged there between and with a top side filler layer arranged atop the assembled tire tread with a low-adhesion layer of low-adhesion material arranged between the tread and the filler layer, in accordance with a particular embodiment of the invention.

Figure 6B:
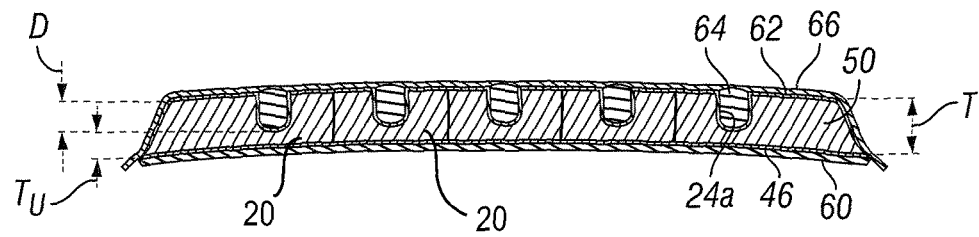

FIG. 6B is a front section view of an assembled tire tread comprising a plurality of tread components with top side grooves arranged in a side-by-side, abutting arrangement atop a base retention structure with a bonding layer arranged there between and with a top side filler layer arranged atop the assembled tire tread with a low-adhesion layer of low-adhesion material arranged between the tread and the filler layer, in accordance with a particular embodiment of the invention.

Figure 7:
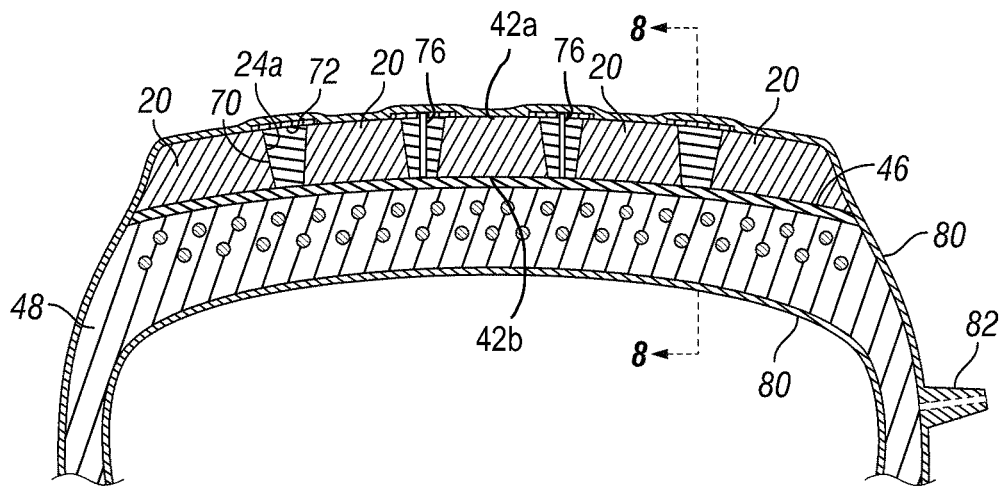

FIG. 7 is a front section view of an assembled tire tread comprising a plurality of tread components arranged in a spaced relation to form full-depth top side grooves atop a tire carcass with a bonding layer arranged there between with spacers arranged within the top side grooves to form an assembled retreaded tire, which is arranged within a surrounding curing membrane for curing the assembled retreaded tire within a curing chamber, in accordance with a particular embodiment of the invention.

Figure 8:
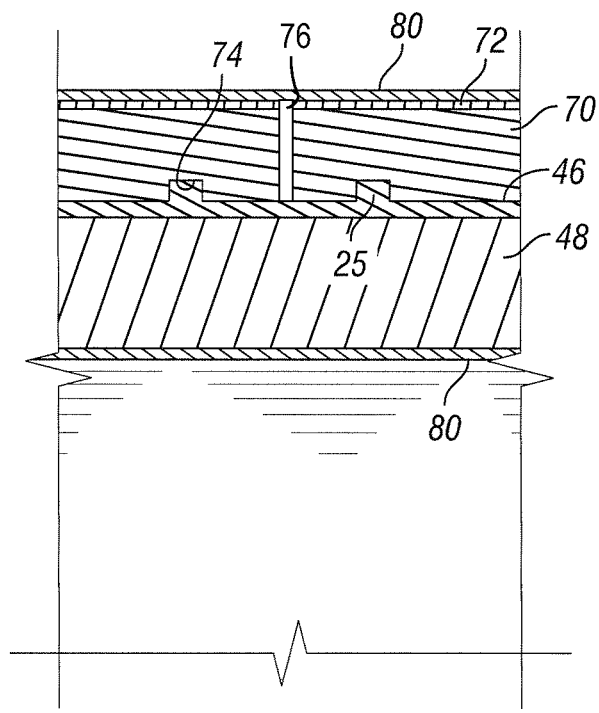

FIG. 8 is a side section view taken along line 8-8 in FIG. 7, showing an alternative embodiment of the spacer having cavities arranged therein to form corresponding protrusions within the top side groove.

DETAILED DESCRIPTION OF PARTICULAR EMBODIMENTS

Particular embodiments of the present invention include tire treads, methods of forming a plurality of tread components for use in assembling a tire tread, methods for forming a tire tread from a plurality of separate, independent tread components, and methods of forming a retreaded tire. In more particular embodiments, independent tread components are formed and a plurality arranged to assemble a tire tread for use in tire retreading. By providing a plurality of independent tread components, a more efficient use of the volumetric molding capacity of a mold may be achieved while also being able to form any of a variety of treads from an inventory of different tread components. In further embodiments, a tread component may be configured to be used in different orientations to achieve different tread designs, which can reduced the inventory of different tread components.

Particular embodiments of the invention include methods for forming a retreaded tire. In such embodiments, the methods include a step of providing an annular tire carcass configured for receiving a tread. During retreading operations, an existing tire is typically prepared by removing at least a portion of the original tread from the tire through an abrading or buffing operation. The remaining portion of the tire is generally referred to as the tire carcass. For example, the tire carcass forms an annular article generally including a pair of opposing sidewalls each extending radially outward from a bead to a central portion extending laterally between the sidewalls. During the retreading process, a tread is arranged along an outer side of the central portion to form a retreaded tire. In other words, the tread is arranged around an outer circumference of the tire carcass. It is generally understood that the tire carcass is previously manufactured, that is, previously molded and cured (or, in other words, vulcanized). Any desired tread and tire carcass may be employed. An exemplary tire treads and tire carcasses are discussed further below with reference to the figures. This process, however, may be applicable to forming new tires where both the tread and tire carcass are new. Prior to application of the tread, a bonding layer of bonding material may be arranged between the tire carcass and the new tread to promote adhesion and bonding there between. The bonding material may comprise any known material suitable for its intended purpose of bonding the new tread to the tire carcass. For example, the joining material may include an adhesive or material curable by way of vulcanization, such as natural or synthetic rubber or any other elastomeric and/or polymeric material, which is commonly referred to as liaison rubber or cushion gum.

Particular embodiments of such methods further include a step of providing a plurality of tread components each comprising an independent structure. As will be discussed further below, the plurality of tread components are provided as independent structures, that is, as individual structures separate from the other tread components, for the purpose of assembling a complete tire tread from the plurality of tread components, where the tread may include any void features currently included in any known tread design, which may be arranged along the top side of the tread, bottom side of the tread, or suspended within a thickness of the tread between the top and bottom sides of the tread. By doing so, a tire tread may be assembled from any combination and arrangement of one or more different tread components comprising the plurality of tread components, each of which may differ in type, design, and/or size. For example, the tread component may comprise a tread component having a length configured to extend around a circumference of the tread or a tread component having a length configured to extend partially around a tire circumference (each being referred to as full-length and a partial-length tread component, respectively). In particular embodiments, a full-length tread component comprises or include a rib, where the top side of the rib does not include any longitudinal groove. In further embodiments, a partial-length tread component comprises or includes a lug, which is a partial length rib. By further example, a tread component may comprise an interior component or a shoulder component, where the shoulder component is configured to form a lateral side edge of the tread and the interior component is configured to be arranged between a pair of shoulder components. By further example, a tread component comprises a solid member or a member including one or more void features extending within the tread component thickness, where a void feature may comprise any longitudinal or lateral groove or sipe, for example. Therefore, in particular embodiments, the step of providing a plurality of tread components comprises providing a plurality of tread components comprising one or more of a full-length tread component, such as a rib, configured to extend continuously around a circumference of the tire carcass between opposing terminal ends of the component and/or a partial-length tread component, such as a lug, configured to extend partially around a circumference of the tire carcass. Accordingly, any one or more tread components may form alone or in combination any tread element, such as a rib or a lug, for example.

In other variations, a plurality of tread components comprise a first plurality of tread components of a first design configured to be arranged in an upright arrangement or an inverted arrangement. By providing tread components that may be inversely used in assembling a tread, a reduction in inventory may be achieved without sacrificing tread assembly and design. It is understood that tread components configured for inverse arrangement may employ any desired design. For example, in particular instances, the first plurality of tread components each include a void extending into a thickness of the tread from a first side, the first side configured to form a portion of the tread top side and the void configured to form a top side groove when each tread component is arranged in the upright arrangement, the first side also configured to form a portion of the tread bottom side and the void configured to form a bottom side groove when each tread component is arranged in the inverted arrangement.

It is understood that the plurality of tread components may be formed by any suitable method, including manually cutting and shaping tread components from any uncured or cured elastomer, such as any natural or synthetic rubber. However, in particular embodiments, the independent tread components are formed by a molding operation to provide precured tread components. In more particular embodiments, a plurality of tread components are formed in a single mold. While all or less than all of the plurality of tread components for use in assembling a single tread may be formed in the single mold, nonetheless, a quantity (full or partial) of the plurality of tread components may be molded in a single mold. Therefore, it follows that a plurality of tread components of the same or of different type, design, and/or size may be formed in a single mold. Accordingly, in particular embodiments, the step of providing includes molding a quantity of the plurality of tread components comprising two or more different tread components in a single mold. Traditionally, at least one full width tread is molded in a mold. Instead, according to the present invention, a mold that would otherwise be used to mold a full width tread is instead configured to mold a plurality of tread components that may be used to assemble a tire tread. By doing so, any of a variety of different tire tread designs may be selectively assembled using any of a variety of one or more different tread components. Furthermore, when tread grooves are formed by spacing apart two or more tread components during tread assembly (discussed further herein), the tread components may be formed more closely in the mold (rather than maintaining the groove spacing in the mold) for the purpose of more efficiently using, and even maximizing, the mold volume to form as much usable tread as possible. For example, in lieu of spacing apart the tread components in the mold by the width of a groove, a shorter spacing is employed to better maximize the mold volume.

While it is understood that each tread component maybe molded separately, in particular embodiments, a molded connector extends between closely arranged adjacent tread components within the mold. By molding a plurality of connected tread components, the plurality tread components may more easily be demolded from the mold and handled subsequent to demolding.

Once demolded, to provide separated, independent tread components, the plurality of connected tread components are separated by cutting and/or abrading the connectors. Accordingly, such methods include separating the plurality of the tread components subsequent to molding the plurality of tread components. It is understood that any remnant of a connector may be substantially removed from any tread component by any desired operation, such as, without limitation, by cutting or abrading.

Once separated, each of the plurality of tread components may be arranged for use or storage. For example, if one of the plurality of tread components comprised a rib, the length of the rib may be wound into a winding, which is stored and may even be transported to any local or remote location for later use and discharge in assembling a tire tread during retreading operations. For example, in particular embodiments, the winding is formed at a tread molding manufacturing facility and is subsequently sent to a tire retreading facility for use in assembling the tire tread on a tire carcass. When one of the plurality of tread components is a lug, one or more lugs may also be arranged in an abutting or spaced array (of uniform or of varied spacing) atop a removable base structure, such as a plastic sheet, film, or any other structure contemplated herein, for example, to form a length of tread components that is later wound and stored or even transported as discussed above in association with the rib winding. Accordingly, in particular further embodiments of the methods of forming a retreaded tire, the step of providing a plurality of tread components includes selecting the plurality of tread components from an inventory of tread components comprising a plurality of different types of tread components having different designs. For example, the inventory of tread components are precured tread components.

The methods of forming a retreaded tire include a step of assembling the plurality of tread components to form an assembled tire tread, the tire tread having a thickness extending between a top side configured to engage a ground surface during tire operation and a bottom side configured for attachment to an annular tire carcass configured for receiving the tire tread. It is understood that the tread components, when having a thickness equal to a thickness of the tread, may be arranged in any combination and configuration in a lateral direction of the tread width and in a longitudinal direction of the tread length to form the tire tread. Tire treads are often formed to include a tread pattern along an outer, ground-engaging side or face of the tread for engagement with a ground surface during tire operation. This outer, ground-engaging side is also referred to as a top side of the tread. It is understood that the top side and an opposing bottom side (also referred to as an underside) define the thickness of the tread. In particular instances, the tread pattern includes one or more tread features each comprising voids arranged along the top side, which extend into the tread thickness from the top side. For example, tread features may comprise grooves or sipes extending into the tread thickness. Sipes generally form thin voids molded or cut into the tread. By further example, grooves may comprise longitudinal and/or lateral grooves. "Longitudinal grooves" generally extend lengthwise (longitudinally) along a length of the tread, while "lateral grooves" generally extend lengthwise (longitudinally) along a width of the tread. The length of the tread extends in a lengthwise direction of the tread, while the width of the tread extends in a widthwise direction of the tread. Longitudinal grooves may extend continuously around the tire to form circumferential grooves when the tread is arranged on a tire. Lateral grooves may also extend continuously across the width of the tread. It is understood that any grooves may extend lengthwise along any linear or nonlinear path. Furthermore, it is understood that any groove may extend continuously or discontinuously along the full length or width of the tread. Tread features comprising voids arranged along the top side are referred to herein as outer or top voids or top side voids. It is understood that any tread features may be formed in any of the plurality of tread components, or may be formed by spacing-apart any adjacent tread components as otherwise discussed herein. Likewise, portions of a tread forming a portion of the top side (and any surface arranged along the top side from which top side void features extend into the tread thickness) arranged or extending between void features may be formed by a single tread component or by the cooperation of two or more adjacent tread components, such as where a plurality of tread components are arranged to form a rib or lug, which then include one or more joints.

As a plurality of longitudinal windings of the tread components are arranged around the tire carcass to form a width of the assembled tread, it is understood that each circumferential winding may comprise an arrangement of one or more tread components in a direction of the tread length. Therefore, one or more joints between two or more tread components exists or between terminal ends of a single tread component when the tread component is a full length tread component extending fully around a circumference of the tire carcass. Therefore, the plurality of joints arranged around the tread may be configured to be staggered around the tire carcass, in lieu of having all of the joints be aligned to extend across the tread width—which would be the case if a monolithic, full width tread in the prior art were wound about the tire carcass. Accordingly, by staggering the joints as proposed, joint tape and staples as used to securely join the widthwise continuous joint of prior art treads may be avoided with the current invention.

Once assembled, the methods of forming a retreaded tire include a step of bonding the tread to the tire carcass to form a retreaded tire, the tire tread being arranged along an outer circumference of the annular tire carcass with a bonding layer between the tire tread and the tire carcass, the bonding layer comprising an uncured elastomeric material being cured during the step of bonding. In performing the step of bonding, in particular embodiments, the step of bonding the tread to a tire carcass is achieved by exposing the assembled tire tread to heat and pressure according to any known process. For example, when the plurality of tread components are precured, the step of bonding is achieved by placing the assembled tire into a curing envelope to form a curing assembly, where the curing assembly is arranged within a curing chamber of an autoclave.

In particular embodiments of the methods of forming a retreaded tire, the tread is assembled along the tire carcass where at least a portion of the plurality of tread components are arranged in an adjacent, abutted arrangement. In particular, the step of assembling a tire tread includes concurrently arranging the plurality of tread components around the outer circumference of the tire carcass to form a tire tread. In particular instances, in the step of assembling a tire tread by concurrently arranging the plurality of tread components around the tire carcass, at least a portion of the plurality of tread components are arranged side-by-side in an abutting arrangement. Side-by-side arrangement connotes arrangement of one tread component adjacent to another tread component relative sidewalls of each tread component within a thickness of the tread, while an abutting arrangement connotes abutting engagement between adjacent tread components. In particular embodiments, an abutting arrangement comprises a mating arrangement, where non-planar sidewalls of adjacent tread components interconnect, overlap, extend into one another. While not necessary for a mating arrangement, in particular embodiments, a mating arrangement is achieved between sidewalls of adjacent tread components that are inversely identical.

It is understood that tread components arranged in an abutting arrangement may not be bonded to each other, in particular embodiments bonding material is arranged between precured tread components to bond adjacent tread components. Accordingly, in particular embodiments, the step of assembling a tire tread comprises arranging at least a portion of the plurality of tread components side-by-side in a bonded arrangement, where non-cured bonding material is arranged between each of the plurality of tread components, which is later cured to form the retreaded tire.

It is also understood that in such embodiments, all of the plurality of tread components may be arranged side-by-side in an abutting arrangement, or at least a portion of the plurality of tread components may be arranged in a side-by-side spaced-apart arrangement (such as will be discussed further herein).

In arranging the plurality of tread components along a tire carcass, it is understood that bonding material is arranged between the assembled tread and the tire carcass. For example, in particular instances, a bonding layer of bonding material is arranged along an outer circumference of the tire carcass and the plurality of tread components are arranged atop the bonding layer to concurrently assemble the tread along the tire carcass.

As discussed more generally above in association with the step of providing a plurality of tread components, it is understood that in assembling the tread, any variety of different tread components may be employed to assemble the tread while concurrently arranging the tread along the tire carcass. For example, in the step of assembling a tire tread, a plurality of tread components comprise a first plurality of tread components of a first design, where a portion of the first plurality of tread components are arranged atop the bonding layer in an upright arrangement and where another portion of the first plurality of tread components are arranged atop the bonding layer in an inverted arrangement. In particular instances, the first plurality of tread components each include a void extending into a thickness of the tread from a first side, the first side configured to form a portion of the tread top side and the void configured to form a top side groove when each tread component is arranged in the upright arrangement, the first side also configured to form a portion of the tread bottom side and the void configured to form a bottom side groove when each tread component is arranged in the inverted arrangement.

In assembling the tread components in an abutting arrangement to form a tire tread, gas vents may be employed to communicate gas from a bottom side of the tread to a top side of the tread for the purpose of reducing and even eliminating the trapping of gases between the tire tread and the tire carcass. For example, in particular embodiments, in the step of assembling a tire tread from the plurality of tread components, a bottom side venting void is arranged in fluid communication with a bottom side of a first tread component of the plurality of tread components, the bottom side forming a portion of the tread bottom side and the bottom side venting void extending to a lateral side of the first tread component in fluid communication with the tread top side. In more specific embodiments, the bottom side venting void is arranged in fluid communication with a top side venting void extending into the tread thickness from the tread top side. While this top side venting void may be arranged within a single tread component, in particular embodiments, the top side venting void extends between the first tread component and a second tread component of the plurality of tread components arranged adjacent the lateral side of the first tread component. In particular configurations, the bottom side venting void is in fluid communication with a bottom side void forming a recessed groove, which may be referred to as a connector groove.

In further embodiments of the methods of forming a retreaded tire, the tread is assembled along a base retention structure for later use and application to a tire carcass. In particular, the step of assembling the tire tread includes assembling the tire tread such that a bottom side of the tire tread is in removable attachment atop a base retention structure. In doing so, the tread components maybe assembled directly upon the base retention structure, or upon a bonding layer of bonding material arranged atop the base retention structure.

A base retention structure may comprise any structure configured for removably retaining the tire tread assembled from a plurality of tread components. Removable retention connotes the ability to retain the tire tread while also allowing for removal of the tire tread without damaging the tire tread. Accordingly, if the tire tread or bonding layer is tacky, the base retention structure is formed of a low-adhesion or non-stick material or is coated or clad with a low-adhesion or non-stick material to resist substantial bonding between the base retention structure and the tread. For example, such a coating may comprise a Teflon® coating or a coating sold by Korolon™, such as a polymer based coating with solid lubricants referred to as Korolon 700™, a tungsten disulfide based coating with solid lubricants referred to as Korolon 800™, or a nickel-chrome based coating with solid lubricants referred to as Korolon 135™. By further example, the base retention structure may be formed of a flexible plastic material, and may form sheet, film, or other flexible structure.

In arranging the plurality of tread components atop the base retention structure (either directly or indirectly with a bonding layer arranged there between), all or a portion of a plurality of tread components may be arranged in abutted arrangement as discussed above in association with other embodiments. However, in particular embodiments, at least a portion of the plurality of tread components are arranged in a spaced relation relative to an adjacent tread component of the plurality of tread components to form a top side void, such as without limitation a longitudinal or lateral groove or sipe, extending into a thickness of the tire tread from the tread top side between adjacent, spaced-apart tread components. As with other embodiments, the plurality of tread components provided and assembled to form the tread atop the base retention structure may comprise any of one or more different tread components.

Once the tire tread has been assembled atop the base retention structure, in particular embodiments, the step of assembling the tire tread includes applying a low-adhesion layer comprised of low adhesion material (which includes non-stick material) along at least portions of the top side of the tire tread after removably assembling the tire tread atop the base retention structure. In particular examples, the low-adhesion layer comprises a coating or cladding, such as any material discussed above, for example. In further examples, the low-adhesion layer comprises a sheet or film of plastic. Optionally, the low-adhesion layer is applied to the top side of the tread using an adhesive. Additionally, gas arranged between the sheet and the tread top side may be substantially removed using vacuum pressure, which in effect vacuum shrinks a plastic sheet along the tread top side, for the purpose of adapting the sheet to any contour or void arranged along the tread top side.

Once the low-adhesion layer has been arranged along the top side of the assembled tread, the step of assembling the tire tread includes applying a filler layer of material along at least portions of the tread top side, such as within any top side void by example. While the filler material may comprise any suitable material, in particular embodiments, the filler material comprises a curable material applied in an uncured, pliable form overtop the low-adhesion layer. By applying the filler layer in a pliable form, the filler layer adapts to the contours and generally fills any voids arranged along the top side. In doing so, the filler layer aids in preserving the dimensions of the voids and any spacing between adjacent tread components arranged in a side-by-side, spaced-apart arrangement. Because the filler layer is arranged overtop the layer of low-adhesion material, the filler layer is removable and separable from the assembled tire tread, such as after application of the tread to the tire carcass, and can therefore be referred to a removable filler layer. While it is understood that the filler material may be applied in any desired manner or form using any suitable method or device, in particular embodiments the filler material is applied to any portion or across the entire tread top side as an extrusion by employing an extrusion process. The extrusion may be generally shaped or specifically shaped to mate with the tread top side. In other embodiments, strips of material are preformed, cut to a desired length, and subsequently arranged within the tread top side voids.

Once the filler layer has been applied, a cover layer is optionally arranged atop the filler layer to complete an assembled tire tread for later use in tire retreading operations. The cover layer is employed to cover and preserve the filler layer until the assembled tread is applied to a tire carcass and cured. It is understood that the top cover may comprise any flexible material, such as plastic for example, to form a flexible cover layer. Just as discussed above with regard to the plurality of tread components, the assembled tire tread may also be wound to form a tire tread winding, which may be stored and transported locally or remotely for later use in assembling a retreaded tire assembly. Therefore, the tire tread winding is configured to be unwound prior to application to the tire carcass.

It is understood that the low-adhesion layer, the filler layer, and the cover layer may be applied to particular portions of the tread top side, such as within any top side void comprising a groove by example, or may be applied across the entire top side of the tread.

In any embodiment of forming an assembled tire tread (also referred to as a tire tread assembly) arranged along a base removable structure, prior to applying the assembled tire tread along the tire carcass, the base removable structure is removed. Accordingly, such methods of forming a retreaded tire include the step of applying the assembled tire tread to the tire carcass prior to the step of bonding, the tire tread being arranged along the outer circumference of the annular tire carcass, where prior to applying the assembled tire tread, the removable retention structure is removed from the assembled tire tread to expose an attachment side of the assembled tire tread. It is understood that in various embodiments, the attachment side of the assembled tread being is operably attached to a bonding layer previously applied to the tire carcass and/or is operably attached to the tire carcass by way of the bonding layer of the assembled tread. Therefore, in particular embodiments, a bonding layer is also applied to the tire carcass prior to application of the assembled tire tread upon the tire carcass—in addition to the bonding layer arranged with the assembled tire tread for application to the tire carcass with the assembled tread. In other variations, where a bonding layer is arranged with the assembled tire tread for application to the tire carcass with the assembled tread, an adhesive, often referred to as "cement" within the industry, is applied to the tire carcass, in lieu of a bonding layer, prior to applying the assembled tire tread onto the tire carcass. While any suitable adhesive may be employed, in particular embodiments the adhesive is a cement comprising a liquefied bonding rubber. After the assembled tire tread has been applied to the tire carcass and after performing the step of bonding, the filler layer of curable material (which is now cured) is removed, with any cover layer, in a cured form to expose a top side of the tire tread. If the layer of low-adhesion material comprises a definable structure, such as a sheet, for example, as opposed to a particularized coating that is not readily removable by grasping and pulling, the layer of low-adhesion material is also removed concurrently with, or subsequent to, removing the filler layer to expose a top side of the tire tread.

In further embodiments of the methods of forming a retreaded tire, the step of assembling the tire tread includes assembling at least a portion of the plurality of tread components along the tire carcass in a side-by-side, spaced-apart arrangement relative to an adjacent tread component of the plurality of tread components to form any top side void feature, such as a longitudinal or lateral groove, extending into a thickness of the tire tread from the tread top side between the tread components arranged in the side-by-side, spaced-apart arrangement, and arranging a spacer within the top side void feature between the adjacent, spaced-apart tread components to define the shape of the top side void feature. This embodiment utilizes a spacer, in lieu of a filler layer as discussed above, to maintain the dimension between the adjacent, spaced-apart tread components during the retreading process. As with other embodiments, the plurality of tread components provided and assembled to form the tread atop the base retention structure may comprise any of one or more different tread components.

It is understood that after performing the step of bonding, the spacer is removed from the retread tire and the tire tread. To facilitate removal of the spacer, the spacer may be made of a low-adhesion material (which includes non-stick material) or at least one of the top side groove and the spacer is coated or clad with low-adhesion material. Furthermore, in particular embodiments, the spacer is formed of, or coated or clad with, heat-resistant material suitable to resist the heat to which the spacer is exposed during curing operations for the purpose of maintaining the structural integrity of the spacer, including the size and shape of the spacer, which allows the spacer to maintain a desired dimension and shape of the top side groove and which may allow the spacer to be reused for subsequent retreading operations. For example, the spacer may be formed of Teflon®, a suitable plastic, or butyl rubber. In certain embodiments, the low-adhesion material may be configured to retain its low-adhesive properties at elevated temperatures, such as those experienced during curing operations. For example, such a coating may comprise a Teflon® coating or a coating sold by Korolon™, such as a polymer based coating with solid lubricants referred to as Korolon 700™, a tungsten disulfide based coating with solid lubricants referred to as Korolon 800™, or a nickel-chrome based coating with solid lubricants referred to as Korolon 135®.

It is understood that the spacer may comprise any shape to provide a top side groove having any desired shape. In particular, the spacer has a length configured to extend along a length of the top side groove, a width configured to extend transverse to the length across a width of the top side groove, and a height configured to extend into a depth of the top side groove, the height extending from a first terminal end to a second terminal end. It can be said that the spacer width extends transverse to both the length and the height of the spacer. Accordingly, once arranging the spacer within the top side groove, the spacer has a length extending along a length of the top side groove, a height extending into the depth of the top side groove from an outer side to a terminal end, and a width extending transverse to the length and height of the spacer. It follows that the length of the spacer may extend longitudinally along any desired path, which may be any linear, curvilinear, or otherwise nonlinear path. Likewise, the cross-section of the spacer, taken along a plane in which the spacer width and height extends transverse to the spacer length, may form any shape desired, and in particular instances, forms a shape desired for the top side groove. In fact, in more specific instances, the spacer may include local cavities or projections for forming certain features within the top side groove, such as strengthening members, wear indicators, and/or stone ejectors. Furthermore, the spacer may include a venting passage extending within a height of the spacer to vent gas from within the void feature, such as below the spacer for example. The venting passage may comprise any one or more voids or passages extending through a height of the spacer, centrally between transverse sides or along any side of the spacer, including any void passage contemplated for use with any tread component discussed herein.

The length of each spacer may be as desired. For example, the spacer length may be configured to extend circumferentially around the tire tread or to extend the length of the top side groove. Accordingly, the spacer may extend longitudinally between a pair of opposing terminal ends, or may be annular (that is, continuous) and expandable.

It is understood that the height of the spacer may be equal to, greater than, or less than the depth of the top side groove. For example, in particular embodiments, the height of the spacer extends the full depth of the top side groove, such that the second terminal end of the spacer engages the bottom of the top side groove, which may coincide with or operate as the bonding layer upon which the tire tread is arranged. In further embodiments, to control the depthwise extension of the spacer height (and thereby the second terminal end of the spacer) into the depth of the top side groove, the spacer may include a stop portion configured to engage the top side of the tire tread. While the stop portion may be arranged at any location along the spacer, in an exemplary embodiment, the stop portion is arranged along the first terminal end extending outwardly from the spacer width and configured to engage the top side of the tire tread.

Further steps of the present method may include the step of placing a curing membrane around an outer circumference of the tread and at least a portion of the tire carcass. It is understood that any known curing membrane to one of ordinary skill in the art, and any obvious variation thereof, may be employed in performing this step. Curing membranes are also referred to as curing envelopes within the industry. Generally, a curing membrane includes an outer body, shell, or membrane having a tread portion extending annularly to circumscribe the tread. The body includes a thickness and extends widthwise in a lateral or axial direction. The outer body typically extends widthwise the full width of the tread, and may extend further. The body may comprise one or more sections to achieve its purpose of covering the outer tread surface and becoming sealed to create an interior pressurization compartment between the tread and the curing membrane, which initially is placed under vacuum pressure during retread curing operations to substantially remove the air between the curing membrane and the tire assembly, and then is exposed to increased pressure to aid in the curing process. In one example, the pressure inside the curing membrane may reach between about 0.4 MPa to 0.7 MPa (4 to 7 bar); however, the particular pressure will depend on the various methods used for curing the retreaded tire assembly. Exemplary membranes may partially cover tire carcass, such as when the curing membrane extends down each sidewall to engage a wheel upon which the tire carcass is mounted and cured. An exemplary retread curing membrane fully encompassing the retreaded tire is discussed below in conjunction with the figures filed herewith.

Particular embodiments of the present methods may include the step of curing the retreaded tire with the spacer arranged within the top side groove and the curing membrane. To form the retreaded tire, the assembled retreaded tire having an uncured bonding layer must be cured to bond the new tread to the tire carcass. Any method known in the art using a curing membrane may be employed to cure the retreaded tire assembly to form a retreaded tire. For example, the assembled retreaded tire may be arranged within a curing chamber known as an autoclave, where the tire is at least partially surrounded by air or other fluids heated and pressurized according to desired curing formulas or laws. This may include applying pressurized and heated fluids about the tire, or at least about an outer side of the assembled retreaded tire. This may also include expanding a curing bladder, such as by filling the curing bladder with a heated, pressurized fluid, within a central cavity of the tire carcass. Accordingly, particular embodiments of methods for tire retreading further include the step of placing the assembled retreaded tire with the curing membrane arranged thereabout into a curing chamber. It is also noted that, as previously mentioned, in particular embodiments the retreaded tire, as well as the curing membrane and spacer, are exposed to elevated temperatures during the curing process to facilitate bonding of the tread to the tire carcass. For example, in particular embodiments, curing temperatures may rise to 130-140 degrees Celsius.

Other variations may be employed based upon the curing system or method employed. In particular embodiments, for example, the uncured, assembled retreaded tire is placed at least partially within the curing membrane or envelope for at least curing operations within a curing chamber. The curing membrane generally engages the outer side or surface of the tire carcass and tread, to form a skin-like member thereon at least extending circumferentially about the tire and laterally between opposing sidewalls and about the tread of the assembled tire. Any known membrane known in the art may be used. For example, one such membrane extends around the entire tire—circumferentially and laterally. By further example, the tire may be mounted on a wheel while a membrane extends from sidewall to sidewall about the tread. Regardless of the membrane employed, a compartment is generally formed between the membrane and the tire (tread and/or tire carcass), which may be pressurized as desired during curing operations.

Particular embodiments of the present methods further include the step of removing the curing membrane and the spacer after the step of curing has been performed.

The methods discussed above will now be discussed below in association with exemplary embodiments of the present invention.

Figure 1A:
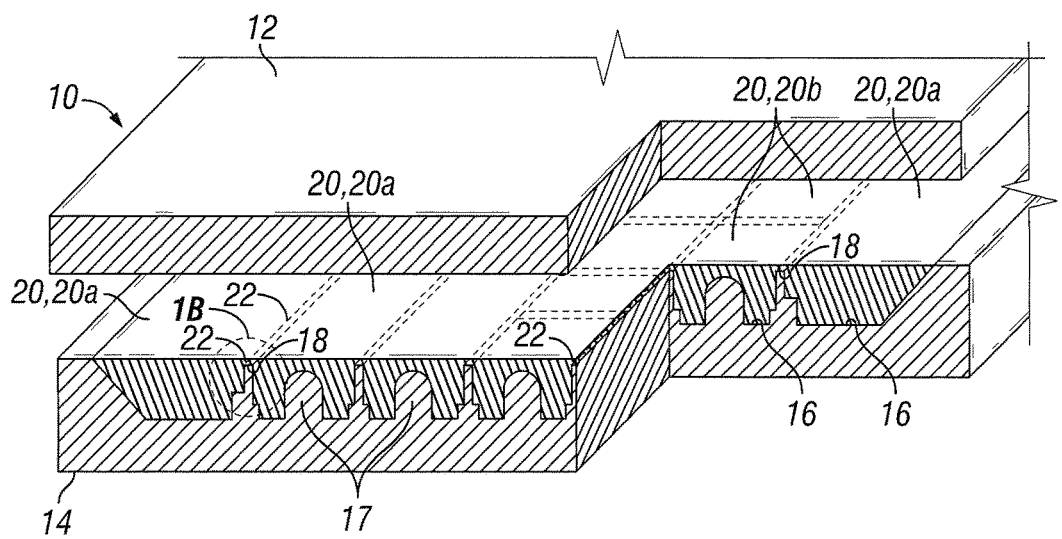
FIG. 1A is a front elevation perspective view of a plurality of tread components being molded within a molding cavity of a mold, in accordance with particular embodiments of the invention.

A discussed above, a retreaded tire may be formed of a plurality of tread components arranged to form an assembled tread. As also discussed, the plurality of tread components may be formed in any known manner. For example, the plurality of tread components maybe formed by a molding process. With reference to FIG. 1A, an exemplary mold 10 is shown comprised of a first side 12 and a second side 14, at least one of the sides having one or more molding cavities 16 for forming one or more tread components 20. While each of the plurality of tread components may be formed within the same mold or in different molds, in the exemplary embodiment shown, a plurality of tread components 20 are molded within a single mold 10, the tread component molding cavities 16 be closely arranged to maximize the molding volume or capacity of the mold.

As with common molding technology, and tread features may be molded into each tread component as desired to create any desired tread pattern along the tread outer surface, within the tread thickness (such as hidden voids), and along the bottom side of the tread. For example, cavities 16 may include projections 17 to form void features (such as longitudinal or lateral grooves or sipes) within each tread component as desired. Exemplary void features are shown in FIGS. 2A-2C, which include longitudinal grooves 24a and/or lateral grooves 24b. Furthermore, as discussed above, vents (vent passages comprising void features) may be provided to vent any gases arranged within the tread thickness or along the bottom side of the tread. For example, with reference to FIGS. 3A and 3B, exemplary vent passages 26 are shown in fluid communication with the bottom side of a tread component (configured to form a bottom side of an assembled tread) by way of a longitudinal groove 24a. In this particular embodiment, venting passage 26 is at least partially arranged along a transverse side 21c (which includes one or more sidewalls) of the tread component, the transverse side extending between a top side 21a and a bottom side 21b of the tread component 20. Furthermore, venting passage 26 comprises a first portion 28a forming a vertical passage extending in a direction of the tread component thickness and a second portion 28b forming a transverse passage extending in a widthwise direction of the tread component, transverse to the tread component thickness.

While a venting passage may extend in fluid communication with top side in certain embodiments, it is understood that a venting passage may be in fluid communication with a void or void feature arranged in an adjacent tread component. For example, with reference to the assembled tread 50 in FIG. 5A, venting passages 26 are shown to be in fluid communication with a longitudinal groove 24a (which can also be referred to as a notch) arranged along the top side 21a and a transverse side 21c of an adjacent tread component 20. As discussed above, it is understood that other venting passages and venting passage configurations may be employed.

Figure 1B:
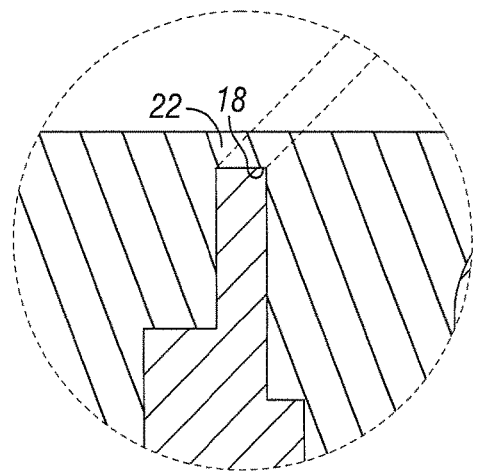
FIG. 1B is a close-up of section 1B of FIG. 1A showing a connector arranged within a corresponding connector-forming cavity in the mold, in accordance with particular embodiments of the invention.

It is understood that the plurality of tread components may be molded separately within a mold, where adjacent tread components are not connected. However, it is also understood that molded a plurality of interconnected tread components may provide improved or more efficient demolding of the tread components. For example, as exemplarily shown in FIGS. 1A and 1B, a plurality of molded tread components 20 are connected to form an interconnected network of tread components. In particular, connectors 22 are arranged between adjacent tread components 20 (at any desired location) to form connections there between. In the embodiment shown, connectors extend from one or more transverse sides 21c of each tread component. Of course, a corresponding connector cavity 18 of corresponding shape is arranged within the mold 10 to form each connector 22.

It is also noted that a single mold may include a plurality of tread components comprising the same or different tread components. For example, in the mold of FIG. 1A, the plurality of tread components includes full-length tread components 20a and partial-length tread components 20b, each of which may form alone or in part a rib or a lug, respectively. Furthermore, the plurality of tread components includes shoulder components configured to form lateral edges of the tread (that is, to form the outward extends or side edges of the tread width) shown individually in FIG. 2A, and central full-length and partial length components configured for arrangement between the shoulder components and which are exemplarily shown in FIGS. 2B and 2C, respectively. Once demolded, the plurality of tread components are separated by any desired manner, such as without limitation by cutting or abrading each connector. Ultimately, the connectors may be removed as desired. The tread components shown in FIGS. 2A-2C have been processed to remove the connectors there from.

Once formed, the tread components may be arranged for storage and ultimate use as desired to form a tire tread. As mentioned above, for example, each of the tread components may be wound to form a tread component winding that may be stored with a plurality of other tread components for ultimate unwinding and use in assembling a tire tread. In an exemplary embodiment shown in FIG. 4, a tread component winding comprising a wound length of the tread component of FIG. 2B is shown. The winding may comprise one tread component, a plurality of separate tread components arranged along a flexible support structure, or a continuous winding of a plurality of tread components, where definitive tread component lengths are cut from the continuous winding. Furthermore, as described above, it is understood that in lieu of a full-length tread components, a plurality of partial-length tread components may be arranged along a length of flexible base retention structure, such as a sheet of plastic or the like, and wound in similar fashion to one or more full-length tread components.

As discussed above, a plurality of one or more different tread components are ultimately arranged to assemble a tire tread (also referred to herein as an assembled tire tread). In particular embodiments, with reference to FIGS. 5A and 5B, a plurality of tread components 20 are arranged along a tire carcass in an abutting arrangement to form an assembled tire tread 50 with a bonding layer 46 arranged between the assembled tread and the tire carcass 48. As exemplarily shown, an abutting arrangement connotes that adjacent tread components are arranged to engage each other. It is understood that tread components may be arranged adjacently in any direction of the tread, such as by being arranged adjacently in a direction of the tread width W or the tread length L shown by example in FIGS. 5A and 5B. It is noted that both top side voids arranged and exposed along top side 42a and bottom side voids (including longitudinal grooves 24a) arranged and exposed along bottom side 42b are formed in the assembled tread, which may be achieve by arranging the different or the same tread component in upright and inverted arrangements along the tire carcass.

Figure 5A:
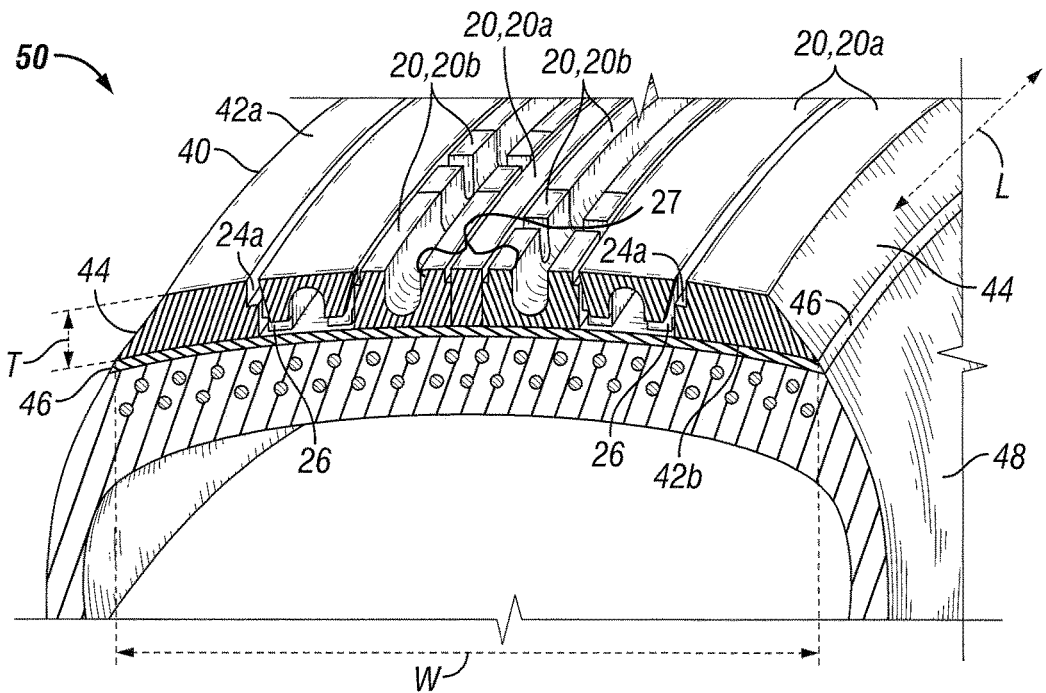
FIG. 5A is a front perspective section view of an assembled tire tread comprising a plurality of tread components arranged in an abutting arrangement atop a tire carcass with a bonding layer arranged there between to form an assembled retreaded tire, in accordance with a particular embodiment of the invention.
Figure 5B:
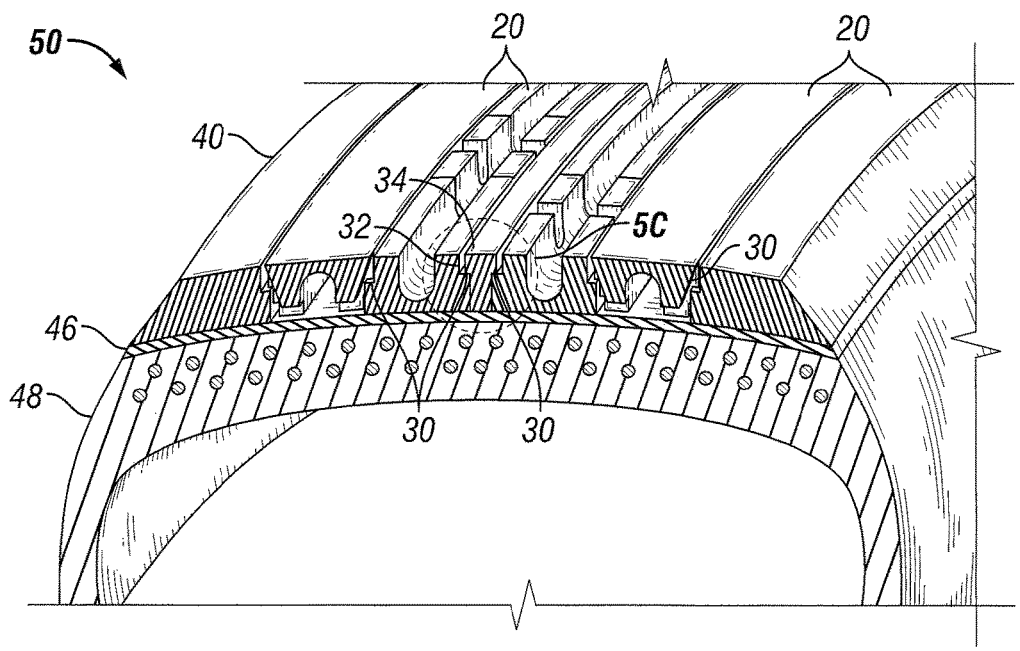
FIG. 5B is a front perspective section view of an assembled tire tread comprising a plurality of tread components arranged in a mating arrangement atop a tire carcass with a bonding layer arranged there between to form an assembled retreaded tire, in accordance with a particular embodiment of the invention.
Figure 5C:
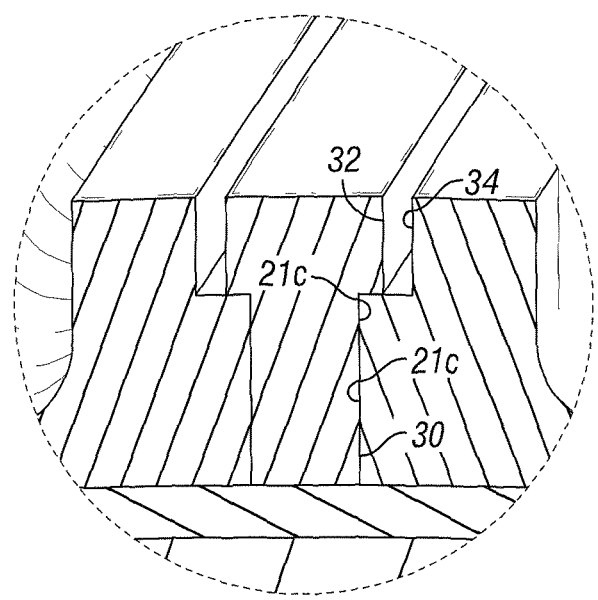
FIG. 5C is a close-up view of section 5C of FIG. 5B showing a mating arrangement of adjacent tread components where portions of extend transversely across a plane extending in a direction of the tread thickness at an interface between the adjacent read components to create an overlap, in accordance with a particular embodiment of the invention.

While the plurality of tread components 20 are arranged in an abutting arrangement in each exemplary arrangement shown in FIGS. 5A and 5B, the assembled tread 50 of FIG. 5B includes a plurality of tread components 20 arranged in a mating arrangement at interface 30. This is because transverse sides 21c of adjacent tread components 20 are non-planar, where a portion of one tread component overlaps a portion of the other tread. For example, with reference to FIGS. 5B and 5C, adjacent tread components 20 overlap in a direction transverse to the tread thickness T, whereby a portion of one of the overlapping treads extends across a line extending in a direction of the tread thickness. In other words, transverse sides 21c of adjacent tread components 20 overlap across an interface 30, whereby a first extension 32 of one adjacent tread component extends into a recess 34 of the other adjacent tread component. It can also be said that the mating arrangement of tread components are interlocked, such that one of the adjacent tread component resists movement of the other adjacent tread component in a particular direction. For example, in FIGS. 5B and 5C, one adjacent tread component 20 resists movement of the other adjacent tread component 20 in a direction of the tread thickness T. It is understood that extensions 32 and recesses 34 may be configured to extend in any direction or shape so to mate and interlock and thereby resist movement of one or the other in any desired direction, such as in the direction of the tread length, width, or thickness.

It is also noted that when arranging tread components in an abutting arrangement (which includes a mating arrangement), one or a plurality of tread components may be arranged to form a rib or lug. With reference to the exemplary embodiment of FIG. 5A, portions or surfaces of a plurality of tread components 20 form tread top side 42a (which forms a ground-engaging surface of the tread), such that at least portions of a plurality of tread components effectively form a rib (and/or lugs in other embodiments) between void features comprising longitudinal top side grooves 24a, as generally denoted by grouping 27. Joints are arranged along the effective rib, the joints being smaller in width than grooves provided to achieve a desired void content in the tire tread for tire performance. Similar arrangements may be configured to take effect at locations within the tread thickness when the tread has sufficiently worn to expose a wear layer within the tread thickness.

In further embodiments of assembling a tire tread, in addition to or in lieu of arranging at least a portion of a plurality of tread components in an abutting arrangement, at least a portion of the plurality of tread components are arranged a spaced relation, that is, in a side-by-side, spaced-apart arrangement, to form a tire tread. By being arranged in a spaced-apart arrangement, top side voids may be formed, such as longitudinal or lateral grooves or sipes without limitation. For example, with reference to FIGS. 6A and 7, a plurality of tread components 20 are arranged in a side-by-side (that is, adjacent), spaced-apart arrangement, where between the spaced-apart tread components top side voids comprising longitudinal top side grooves 24a, are formed.

In particular embodiments represented in FIG. 6A, a tread assembled from a plurality of tread components 20 is arranged overtop a bonding layer 46 arranged on top of a base retention structure 60 for later use and application to a tire carcass. As described in more detail above, the base retention structure may comprise any structure, which includes without limitation a flexible structure separable from the tire tread assembly or the bonding layer when employed. Arranged overtop at least a portion of a top side of the assembled tire tread is a low-adhesion layer 62 of low adhesion material (which includes non-stick material). As described more specifically above, the low-adhesion layer comprises a coating or cladding to facilitate removal of a filler layer arranged overtop the low-adhesion layer. In particular examples, the low-adhesion layer may be applied as a spray, or when comprising a sheet of flexible material, may be applied under vacuum pressure to evacuate any gases arranged between the tread and the low-adhesion layer. To assist in preserving the shape and dimensions of any top side void, a filler layer 64 of suitable material is arranged overtop the low-adhesion layer 62 is to fill at least a portion of one or more top side voids. In the embodiment shown, the filler layer 64 is applied at different, separate locations across the tread top side to form a discontinuous filler layer, where the different, separate locations coincide with the location of top side grooves 24a. It is also noted that the filler layer may extend generally the full depth of a void, such as is shown in both FIGS. 6A and 6B, whether the depth D of the void extends the full thickness T of the tread (See FIG. 6A for example) or partially through the tread thickness (see FIG. 6B for example), where an undertread thickness $T_U$ remains below the void. Finally, an optional cover layer 66 is shown arranged atop the filler layer 64 to complete an assembled tire tread for later use in tire retreading operations. As stated above, the cover layer is employed to cover and preserve the filler layer until the assembled tread is applied to a tire carcass and cured, and therefore is formed of any suitable material, which includes a flexible material. Upon completing the assembled tire tread, the tire tread may be stored for later use in assembling a retreaded tire. Prior to use in assembling a retread tire and application of the tread along a tire carcass, the base retention structure is removed to expose the assembled tire tread with or without any bonding layer.

It is also understood that the technique of using a base retention structure, a low-adhesion layer, a filler layer, and any cover layer may employed to assemble a tread from any arrangement of tread components for later application to a tire carcass, including any a side-by-side, spaced-apart arrangement or even any abutted arrangement as is exemplarily shown in FIG. 6B or discussed in association with the embodiments of FIGS. 5A and 5B.

In further embodiments, a tread may be assembled from a plurality of tread components arranged in a side-by-side, spaced-apart arrangement using a spacer. In these embodiments, with reference to the exemplary embodiment of FIG. 7, a spacer 70 is arranged within a top side void feature comprising a longitudinal groove 24a arranged between adjacent, spaced-apart tread components 20. As discussed above, the spacer is formed of any suitable material for the purpose of achieving or preserving the shape and dimensions of the top side void. Optionally, the spacer may include a stop 72 for use in controlling the depth of spacer relative the top side void feature in which it is arranged. In the embodiment shown, the height of the spacer, extending between first and second terminal ends, extends a full depth of the top side void. Still, the spacer is employed to prevent any further extension of the spacer into the bonding layer or the tire carcass. While the spacer is shown arranged at a first terminal end of the spacer height, it is understood that the spacer may be attached to or formed with the spacer in any other desired manner.

It is noted that a spacer may extend generally the full depth of a void, such as is shown in FIG. 7, whether the depth of the void extends the full thickness of the tread (See FIGS. 6A and 7 for example) or partially through the tread thickness (see FIG. 6B for example). It is also noted that a spacer may be used whether or not the void in which it is arranged is formed by spacing apart adjacent tread components, as the spacer may be arranged within a void formed solely within a single tread component, such as to provide additional support around any portion of void to resist any possible deformation of the void during retreading operations. For example, the thickness of the tread below the void may be sufficiently thin such that the bottom of the void is susceptible to being deformed during the step of bonding. For the same reasons, the filler layer in the prior embodiments may be used within the same types of voids. It is also noted that the top side voids formed by the spaced-apart tread components may be arranged overtop a pre-existing void arranged in the tire carcass, where a portion of the prior, used tread remains for the purpose of reducing waste by not removing otherwise usable tread material. Therefore, any such spacer or filler layer may extend into the pre-existing void, which may comprise a longitudinal or lateral groove, for example.

As discussed above, the spacer may form any desired shape, including having any desired cross-sectional shape arranged within a plane extending in a direction of the spacer height (i.e., in the direction of the tread thickness) and in a direction of the spacer width (i.e., in a direction of the tread width). For example, in FIG. 7, the spacer 70 is shown to have a cross-section extending in such plane having a shape comprising a polygon. Furthermore, the spacer may include voids or cavities and/or any protrusions for form any corresponding feature within the tread top side void. The feature may be formed in the bonding layer or in any pliable portion of the surrounding tread material. For example, with reference to the embodiment of FIG. 8, a section of the spacer taken along a length of the spacer and shown in association with a length of the tread and the tire carcass includes a feature-forming cavity 74 used to form a void feature 25 protruding within the top side void. For example, the protruding feature may form a strengthening member, a stone ejector, or a wear indicator within the to side void. As also discussed above, each spacer may include one or a plurality of vent passages to vent gas from within the void feature, such as below the spacer for example. Although the venting passage may comprise any one or more voids or passages extending through a partial or full height of the spacer and arranged at any location within the spacer, vent passages 76 are shown in FIGS. 7 and 8 to extend a full height of the spacer centrally between transverse sides defining a width of the spacer. A plurality of vent passages may be provided in any repeating or non-repeating arrangement spaced along the spacer length and/or width, for example.

Once a tread has been assembled and arranged about the tire carcass in any manner discussed herein to form an assembled retreaded tire, the tire tread is bonded to the tire carcass in any known manner in accordance with the step of bonding discussed above. For example, with reference to an exemplary embodiment, the assembled retreaded tire is laced within any known curing membrane 80, which may have a pressurization port 82 for attachment to a pressure source for application of vacuum pressure and/or pressurized gases while arranged within a curing chamber.

Other embodiments of the invention comprise providing or forming any of the tread components described herein.

Further embodiments of the invention comprise methods of forming an assembled tire tread using any one or more of the tread components described herein in any contemplated configuration.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention. Ranges that are described as being "between a and b" are inclusive of the values for "a" and "b" unless otherwise specified.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of forming a retreaded tire comprising the steps of: providing an annular tire carcass configured for receiving a tread;
   providing a plurality of tread components each comprising an independent structure;
   assembling the plurality of tread components to form an assembled tire tread, the tire tread having a thickness extending between a top side configured to engage a ground surface during tire operation and a bottom side configured for attachment to an annular tire carcass configured for receiving the tire tread; and,
   bonding the tread to the tire carcass to form a retreaded tire, the tire tread being arranged along an outer circumference of the annular tire carcass with a bonding layer between the tire tread and the tire carcass, the bonding layer comprising an uncured elastomeric material being cured during the step of bonding;
   where the step of assembling a tire tread includes concurrently arranging the plurality of tread components around the outer circumference of the tire carcass to form a tire tread and a bottom side venting void is arranged in fluid communication with a bottom side of a first tread component of the plurality of tread components, the bottom side venting void forming a portion of the tread bottom side and the bottom side venting void extending to a lateral side of the first tread component in fluid communication with the tread top side through a venting passage along one or more sidewalls of the first tread component where the venting passage forms a vertical passage extending in a direction of the tread component thickness and a transverse passage extending in a widthwise direction of the tread component, transverse to the tread component thickness.

2. The method of claim 1, where the plurality of tread components comprise two or more different tread components.

3. The method of claim 2, where the step of providing includes molding a quantity of the plurality of tread components comprising two or more different tread components in a single mold.

4. The method of claim 3, where the step of providing includes separating the plurality of the tread components subsequent to molding the plurality of tread components.

5. The method of claim 4, where subsequent to molding and separating the plurality of tread components, the step of providing includes winding the one or more of the plurality of tread components to form a winding for storage and subsequent unwinding for assembly of a tread.

6. The method of claim 5, where the winding is formed at a tread molding manufacturing facility and is subsequently sent to a tire retreading facility for use in assembling the tire tread on a tire carcass.

7. The method of claim 6, where the step of providing a plurality of tread components includes selecting the winding from a plurality of windings where the plurality of windings includes windings of different tread components of different designs.

8. The method of claim 3, where the quantity of the plurality of tread components includes a first plurality of tread components of a first design configured to be arranged in an upright arrangement or an inverted arrangement when assembled in a tread.

9. The method of claim 8, where the first plurality of tread components each include a void extending into a thickness of the tread from a first side, the first side configured to form a portion of the tread top side and the void configured to form a top side groove when each tread component is arranged in the upright arrangement, the first side also configured to form a portion of the tread bottom side and the void configured to form a bottom side groove when each tread component is arranged in the inverted arrangement.

10. The method of claim 1, where the step of providing a plurality of tread components comprises providing a plurality of tread components comprising one or more of a full length tread component configured to extend continuously around a circumference of the tire carcass between opposing terminal ends of the full length tread component and/or a partial length tread component configured to extend partially around a circumference of the tire carcass.

11. The method of claim 1, where the step of providing a plurality of tread components includes selecting the plurality of tread components from an inventory of tread components comprising a plurality of different types of tread components having different designs.

12. The method of claim 1, where in the step of assembling a tire tread, at least a portion of the plurality of tread components are arranged side-by-side in an abutting arrangement.

13. The method of claim 12, where the abutting arrangement comprises a mating arrangement, where non-planar transverse sides of adjacent tread components overlap.

14. The method of claim 12, where in the step of assembling a tire tread, where the abutting arrangement comprises a bonded engagement.

15. The method of claim 1, where in the step of assembling a tire tread, the plurality of tread components comprise a first plurality of tread components of a first design, where a portion of the first plurality of tread components are arranged atop the bonding layer in an upright arrangement and where another portion of the first plurality of tread components are arranged atop the bonding layer in an inverted arrangement.

16. The method of claim 1, where the plurality of tread components includes one or more full length tread components each configured to extend continuously between opposing terminal ends around a circumference of the tire carcass, and where subsequent to molding and separating the plurality of tread components, the step of providing includes winding the one or more full length tread components to form a winding for storage and subsequent unwinding for assembly of a tread.

17. The method of claim 1, where the bottom side venting void is in fluid communication with a top side venting void extending into the tread thickness from the tread top side.

18. The method of claim 17, where the top side venting void extends between the first tread component and a second tread component of the plurality of tread components arranged adjacent the lateral side of the first tread component.

19. The method of claim 1, where the bottom side venting void is in fluid communication with a bottom side void forming a recessed groove.

20. The method of claim 1, where the step of providing a plurality of tread components comprises providing a plurality of partial length tread components arranged in a lateral direction of the tread width and comprising one or more of the partial length tread components configured to extend partially around the circumference.

21. A tire tread, the tread comprising:
a plurality of tread components each comprising an independent structure, the plurality of tread components arranged to form an assembled tire tread, the tire tread having a thickness extending between a top side configured to engage a ground surface during tire operation and a bottom side configured for attachment to an annular tire carcass configured for receiving the tire tread, where at least a portion of the plurality of tread components are arranged side-by-side in an abutting arrangement and include a bottom side venting void arranged in fluid communication with a bottom side of a first tread component of the plurality of tread components, the bottom side venting void forming a portion of the tread bottom side and the bottom side venting void extending to a lateral side of the first tread component in fluid communication with the tread top side through a venting passage along one or more sidewalls of the first-tread component where the venting passage forms a vertical passage extending in a direction of the tread component thickness and a transverse passage extending in a widthwise direction of the tread component, transverse to the tread component thickness.

* * * * *